(12) United States Patent
Kobylecki et al.

(10) Patent No.: US 6,965,832 B2
(45) Date of Patent: Nov. 15, 2005

(54) INVESTIGATING DIFFERENT PHYSICAL AND/OR CHEMICAL FORMS OF MATERIALS

(75) Inventors: Ryszard Kobylecki, Ely (GB); Daniel Cowell, Cambridge (GB); Vassllis Stylianopoulos, Cottenham (GB)

(73) Assignee: Millennium Pharmaceuticals, Inc., Cambridge, MA (US)

(*) Notice: Subject to any disclaimer, the term of this patent is extended or adjusted under 35 U.S.C. 154(b) by 42 days.

(21) Appl. No.: 10/018,034

(22) PCT Filed: Apr. 9, 2001

(86) PCT No.: PCT/GB01/01593

§ 371 (c)(1),
(2), (4) Date: Jul. 23, 2002

(87) PCT Pub. No.: WO01/77690

PCT Pub. Date: Oct. 18, 2001

(65) Prior Publication Data

US 2002/0183938 A1 Dec. 5, 2002

(51) Int. Cl.⁷ .............................................. G01N 31/00
(52) U.S. Cl. ........................... 702/27; 702/22; 702/23; 702/27; 702/123; 422/68.1; 422/81; 422/100; 422/105; 436/50; 436/174; 436/177; 366/14; 366/17; 366/29; 564/425
(58) Field of Search ............................ 702/22–23, 31, 702/32, 50.85, 98, 99, 121–123, 137, 138, 176, FOR 115, 116, 119; 422/68.1, 81, 82.12, 82.13, 100, 102, 105, 132; 436/50, 174, 177; 366/8, 14, 17–19, 27, 142; 564/425

(56) References Cited

U.S. PATENT DOCUMENTS

| 3,814,582 A | 6/1974 | Rohrbaug et al. |
|---|---|---|
| 3,899,011 A | 8/1975 | Curtiss |
| 3,932,131 A | 1/1976 | Rolfo-Fontana |
| 4,399,687 A | 8/1983 | Collins |
| 4,578,244 A | 3/1986 | Cosgrove, Jr. et al. |

(Continued)

FOREIGN PATENT DOCUMENTS

| EP | 0807811 A2 | 11/1997 |
|---|---|---|
| EP | 0921396 A2 | 6/1999 |
| GB | EP O 553 539 A1 | 8/1993 |
| WO | WO 94/11489 | 5/1994 |
| WO | WO 96/06842 | 3/1996 |

(Continued)

OTHER PUBLICATIONS

McFarland et al., "Combinatorial approaches to materials discovery", Trends in Biotechnology, Mar. 1999, pp. 107–115, vol. 17, No. 3, Elsevier, Amsterdam.

(Continued)

Primary Examiner—Marc S. Hoff
Assistant Examiner—Elias Desta
(74) Attorney, Agent, or Firm—Timothy J. Martin; Michael R. Henson; Rebecca A. Gegick

(57) ABSTRACT

Apparatus and a method are described for investigating polymorphs of a material, isomers of a material which allow different isomeric forms to be resolved, different hydrates/solvates and/or different salts of a material. The apparatus comprises an assembly (2) of reactor devices (6) arranged within a reactor body (8) which incorporates a heating/cooling block (10) and a stirrer block (12). A vessel support block (14) supports respective sample vessels (15) below each reactor device (6) for recieving material from the reactor devices. The apparatus includes a control unit (4) which includes a computer (16) which controls a robot for delivering materials to the reactor devices; a heating/cooling unit (18); a stirrer control unit (20); and a pressure unit (22) which controls the passage of material from the reactor devices (6) to the sample vessels (15).

50 Claims, 10 Drawing Sheets

U.S. PATENT DOCUMENTS

| | | | |
|---|---|---|---|
| 4,835,711 A | | 5/1989 | Hutchins et al. |
| 4,877,745 A | | 10/1989 | Hayes et al. |
| 5,082,058 A | * | 1/1992 | Blumer ........................ 166/300 |
| 5,417,923 A | | 5/1995 | Bojanic et al. |
| 5,445,934 A | | 8/1995 | Fodor et al. |
| 5,463,564 A | | 10/1995 | Agrafiotis et al. |
| 5,556,958 A | * | 9/1996 | Carroll et al. ............. 536/25.3 |
| 5,574,656 A | | 11/1996 | Agrafiotis et al. |
| 5,650,125 A | * | 7/1997 | Bosanquet .................. 422/102 |
| 5,658,802 A | | 8/1997 | Hayes et al. |
| 5,684,711 A | | 11/1997 | Agrafiotis et al. |
| 5,744,305 A | | 4/1998 | Fodor et al. |
| 5,763,278 A | | 6/1998 | Sickinger et al. |
| 5,798,035 A | | 8/1998 | Kirk et al. |
| 5,807,522 A | | 9/1998 | Brown et al. |
| 5,832,182 A | | 11/1998 | Zhang et al. |
| 5,843,767 A | | 12/1998 | Beattie |
| 5,859,703 A | | 1/1999 | Aldridge et al. |
| 5,901,069 A | | 5/1999 | Agrafiotis et al. |
| 5,928,952 A | | 7/1999 | Hutchins et al. |
| 5,956,137 A | | 9/1999 | Lim et al. |
| 5,985,214 A | | 11/1999 | Stylli et al. |
| 5,999,255 A | | 12/1999 | Dupee et al. |
| 6,003,029 A | | 12/1999 | Agrawal et al. |
| 6,045,755 A | | 4/2000 | Lebl et al. |
| 6,100,901 A | | 8/2000 | Mohda et al. |
| 6,140,643 A | | 10/2000 | Brown et al. |
| 6,175,816 B1 | | 1/2001 | Flavin et al. |
| 6,267,935 B1 | | 7/2001 | Hol et al. |
| 6,296,673 B1 | | 10/2001 | Santarsiero et al. |
| 6,327,334 B1 | | 12/2001 | Murray, Jr. et al. |
| 6,333,501 B1 | | 12/2001 | Labrenz |
| 6,421,553 B1 | | 7/2002 | Costa et al. |
| 6,434,490 B1 | | 8/2002 | Agrafiotis et al. |
| 6,487,523 B2 | | 11/2002 | Jarman et al. |
| 6,507,636 B1 | | 1/2003 | Lehmann |
| 6,649,413 B1 | * | 11/2003 | Schultz et al. ................ 436/37 |
| 2001/0016631 A1 | | 8/2001 | Freitag |
| 2001/0055775 A1 | | 12/2001 | Schultz et al. |
| 2002/0032531 A1 | | 3/2002 | Mansky et al. |
| 2002/0037647 A1 | | 3/2002 | Hwang et al. |
| 2002/0048610 A1 | | 4/2002 | Cima et al. |
| 2003/0033088 A1 | | 2/2003 | Agrafiotis et al. |
| 2003/0157721 A1 | * | 8/2003 | Turner et al. .................. 436/34 |
| 2003/0219906 A1 | | 11/2003 | Giaquinta et al. |

FOREIGN PATENT DOCUMENTS

| | | |
|---|---|---|
| WO | WO 96/16078 | 5/1996 |
| WO | WO 98/18549 | 5/1998 |
| WO | WO 98/40159 | 9/1998 |
| WO | WO 98/47613 | 10/1998 |
| WO | WO 98/52614 | 11/1998 |
| WO | WO 99/04247 | 1/1999 |
| WO | WO 99/06814 | 2/1999 |
| WO | WO 99/08112 | 2/1999 |
| WO | WO 99/45379 | 9/1999 |
| WO | WO 99/45389 | 9/1999 |
| WO | WO 00/03240 | 1/2000 |
| WO | WO 00/67872 | 11/2000 |

OTHER PUBLICATIONS

Shekunov et al., "Crystallization processes in pharmaceutical technology and drug delivery design", Journal Of Crystal Growth, Apr. 2000, pp. 122–136, vol. 211, No. 1–4, North–Holland Publishing Co., Amsterdam.

Petty, C.J. et al., "Applications of FT–Raman Spectroscopy in the Pharmaceutical Industry".

Martin, P.A. et al., "Automation of Microtiter Plate–Chromogenic Substrate LAL Endotoxin Assay Method by Use of a Modified Cetus Pro/Pette Express System". Journal of Parenteral Science & Technology, vol. 40, No. 2, Mar.–Apr. 1986, pp. 61–66.

Lenczewski, M. et al. "Automated Screening Method for Determining Optimum Preservative Systems for Personal and Home Care Products",. Journal of AOAC International, vol. 81, No. 3, 1998, pp. 534–539.

Lennernas, H., "Human Intestinal Permeability", Journal of Pharmaceutcal Sciences, vol. 87, No. 4, 1998, pp. 403–410.

George, R. et al. "Automated dissolution testing of sustained release tablets", American Laboratory, Circular Reader Service, Card No. 17, Feb. 1988, pp. 106–112.

Yarmamura, R. et al., "Receptor Binding as a Primary Drug Screen", Neurostransmitter Receptor Binding, 2d ed. Raven Press, 1985, pp. 189–233.

"Department of Health and Human Services", Federal Register, vol. 62, No. 85, 1997, pp. 24302–24309.

Eckstein, R.J. et al. "Unattended, Robotic Drug–Release Testing of Enterically Coated Aspirin", Analytical Chemistry, vol. 58, No. 11, Sep. 1986, pp. 2316–2320.

Song, C.X. et al. "Controlled release of U–86983 from double–layer biodegradable matrices: effect of additives on release mechanism and kinetics",. Journal of Controlled Release, vol. 45, (1997), pp. 177–192.

Gold, G. et al., "Effects of Selected U.S.P. Talcs on Acetylsalicyclic Acid Stability in Tablets", Journal of Pharmaceutical Sciences, vol. 53, No. 1, Jan. 1964, pp. 52–54.

Ward, K. et al., "Automatic Preparation of Protein Crystals Using Laboratory Robotics and Automated Visual Inspection", Journal of Crystal Growth, vol. 90 (1988), pp. 325–339.

Otsuka, M. et al., "Physicochemical Characterization of Glybuzole Polymorphs and Their Pharmaceutical Properties", Research Paper, Marcel Dekker, Inc. 1999, pp. 197–203.

Littlechild, J.A., "Protein Crystallization: Magical or Logical: Can We Establish Some General Rules!",. Journal of Physics D: Applied Physics, vol. 24, No. 2, Feb. 2, Feb. 1991, pp. 111–118.

Chayen, Naomie E. et al., "Microbatch Crystallization Under Oil –A New Technique Allowing Many Small–Volume Crystallization Trials",. Journal of Crystal Growth, vol. 122, Nos. 1–4, Aug. 1992 pp. 176–180.

Craw, S. et al., "Cased–Based Design for Tablet Formulation", pp. 358–369.

Yakolev, YA et al., "A Laboratory Apparatus for Crystal Growth from Solution" Instruments and Experimaental Techniques, vol. 41, No. 2, 1998, pp. 292–296.

Findlay, W. et al., "Utilization of Fourier transform–Raman spectroscopy for the study of pharmaceutical crystal forms". Journal of Pharmaceutical and Biomedical Analysis, vol. 16, (1998) pp. 921–930.

Ferwerda et al., R., et al. "The Use of FT–Raman Spectroscopy and Chemometric Procedures in the Analysis of Pharmaceuticals", Nicolet FT–Raman, (1997).

Tisone, T, "Dispensing Systems for Miniaturized Diagnostics", IVD Technology Magazine, May 1998.

Soriano, T. et al., "Astec: an Automated System for Sitting–Drop Protein Crystallization", Journal of Crystal Growth vol. 196, 1999, pp. 665–673.

Stewart, P. et al., "Practical Experimental Design Techniques for Automatic and Manual Protein Crystallization", Journal of Crystal Growth, vol. 196, 1999, pp. 665–673.

Rubin, B. et al., "Minimal Intervention Robotic Protein Crystallization", Journal of Crystal Growth, vol. 110, 1991, pp. 156–163.

Petty, C. et al., "The use of FT–Raman Spectroscopy in the Study of Formulated Pharmaceuticals", Nicolet Instruments of Discovery, Nicolet Innstrument Corporation (1991).

Carrie et al., "An Automated Sampling Device for Dissolution Testing" J. of Pharmaceutical Sciences, vol. 72, No. 8, Aug. 1983, pp. 976–988.

Oldfield, T.J. et al., "A Flexible Approach to Automated Protein Crystallization", Journal of Applied Crystallization, vol. 24, 1991, pp. 255–260.

Morris, D.W. et al., "Automation of Protein Crystallization Trials: Use of a Robot to Deliver Reagents to a Novel Multi–Chamber Vapor Diffusion Plate",.

Product Application Focus, BioTechniques, vol. 7, No. 5, (1989), pp. 522–527.

Newman, A., "Send in the Robots", Analytical Chemistry, vol. 62, No. 1, Jan. 1, 1990, pp. 29A–34A.

McPherson, A., "Two Approaches to the Rapid Screening of Crystallization Conditions", Journal of Crystal Growth, vol. 122, (1992) pp. 161–167.

Lindsey, J.S. et al., "Robotic work station for microscale synthtic chemistry: On–line absorption spectroscopy, quantitative automated thin–layer chromatography, and multiple reactions in parallel", Rev. Sci. Instrum., vol. 59, No. 6, Jun. 1988, pp. 940–950.

Kelders, H. et al., "Automated protein crystallization and a new crystal form of a subtilizin:eglin complex", Protein Engineering, vol. 1, No. 4, 1987, pp. 301–303.

Jancarik, J. et al., "Sparse matrix sampling: a screening method for crystallization of proteins", Journal of Applied Crystallization, vol. 24, 1991, pp. 409–411.

Bowtell, David D.L., "Options available–from start to finish–for Obtaining Expression Data by Microarray", Peter MacCallum Cancer Institute, pp. 25–32.

Gonzalez, F. et al., "Crocodile: An Automated Apparatus for Organic Crystal Growth from Solution", Acta Astronautica, vol. 25, No. 12, 1991, pp. 775–784.

Gilliland, G. et al., "Biological Macromolecule Crystallization Database, Version 3.0: New Features, Data and the NASA Archive for Protein Crystal Growth Data", Acta Crystallization Section D, 1994, pp. 408–413.

Zhu, H. et al., "Influence of water activity in organic solvent water mixtures on the nature of the crystallizing drug phase 1. Theophylline", International Journal of Pharmaceutics, vol. 135, Jan. 1996, pp. 151–160.

Cudney, B. et al., "Screening and Optimization Strategies for Macromolecular Crystal Growth", Acta Crystallographica Section D, vol. D40, 1994, pp. 414–423.

Cox, M.J. et al., "Experiments with Automated Protein Crystallization", Journal of Applied Crystallography, vol. 20, 1987, pp. 366–373.

Chayen, N. et al., "New Developments of the IMPAX Small–Volume Automated Crystallization System", Acta Crystallographica Section D, vol. D50, 1994, pp. 456–458.

Chayen, N. et al., "An Automated System for Micro–Batch Protein Crystallization and Screening", Journal of Applied Crystallization, vol. 23, 1990, pp. 297–302.

Casay, G.A. et al., "Laser Scattering in a Hanging Drop Vapor Diffusion Apparatus for Protein Crystal Growh in a Microgravity Environment", Journal of Crystal Growth, vol. 122, 1992, pp. 95–101.

Bullock, E. et al., "Apparatus for the growth of crystals from small volumes of solution", Journalof Physics E. Scientific Instruments, vol. 5, 1972, pp. 412–413.

Brodersen, D.E. et al., "XAct: a program for construction, automated setup and bookkeeping of crystallization experiments", Journal of Applied Crystallography, vol. 32, 1999, pp. 1012–1016.

Beckmann, W, et al., "The Effect of Additives on Nucleation: A Low Cost Automated Apparatus", Journal of Crystal Growth, vol. 99, 1990, pp. 1061–1064.

Longmire, M.L. et al., "Polymorph Analysis by Dispersive Raman Spectroscopy", Nicolet Instruments of Discovery.

Andersen G.R. et al., "A Spreadsheet Approach to Automated Protein Crystallization", Journal of Applied Crystallography, vol. 29, 1996, pp. 236–240.

Aldridge, P.K. et al., "A Robotic Dissolution System with On–Line Fiber–Optic UV Analysis", J. of Pharmaceutical Sciences, vol. 84, No. 8, Aug. 1995.

Bowtell, D., "Options Available from Start to Finish for Obtaining Expression Data by Microarray", Nature Genetics Supplement, vol. 21, Jan. 1999, pp. 25–32.

Morris, K. et al., "An Integrated Approach to the Selection of Optiman Salt Form for a New Drug Candidate", International Journal of Pharmaceutics, vol. 105, 1994, pp. 209–217.

Lamparter, E. et al., "The Automation of Dissolution Testing of Solid Oral Dosage Forms", J. of Pharmaceutical & Biomedical Analysis, vol. 10, Nos. 10–12, 1992, pp.727–73.

De Castro, M.D. et al., "Automation fo pharmaceutical dissolution testing by flow injection analysis", Journal of Pharmaceutical & Biomedical Analysis, vol. 8, No. 4, 1998, pp. 329–336.

Lo, Su–Chin, et al., "Automated Drug Dissolution Monitor That Uses a UV–Visible Diode Array Spectrophotometer", Journal of Pharmaceutical Sciences, vol. 82, No. 4, Apr. 1993, pp. 350–354.

Papas, A.N. et al., "Evaluation of Robot Automated Drug Dissolution Measurements", American Chemical Society 1995, pp. 14081411.

Shah, K.P. et al., "Automated analytical systems for drug development studies 3. Multivessel dissolution testing system based on microdialysis sampling", Journal of Pharmaceutical and Biomedical Analysis, vol. 13, 1995, pp. 1235–1241.

Mann, M., "Quantitative proteomics!" Nature Biotechnology, vol. 17, Oct. 1999, pp. 954–955.

Shah, K.P. et al., "Automated analytical systems for drug development studies II–A system for dissolution testing", Journal of Pharmaceutical & Biomedical Analysis. vol. 12, No. 12, 1994, pp. 1319–1527.

Fodor, S. et al., "Light–Directed Spatially Addressable Parallel Chemical Synthesis", Research Article, American Association for the Advancement of Science, vol. 251, No. 4995, Feb. 1991, pp. 767–773.

Fodor, D., "Massively Parallel Genomics", American Association for the Advancement of Science, vol. 277, No. 5324, Jul. 1997, pp. 393–395.

Marshall, A. et al., "DNA chips: An array of possibilities", Nature Biotechnology, vol. 18, Jan. 1998, pp. 27–31.

Ramsay, G., "DNA chips: State–of–the–art", Nature Biotechnology, vol. 16, Jan. 1997, pp. 40–44.

Persidis, A., "An ambitious drug development platform attempts to link gene sequence to expressed phenotype under various physiological states", Nature Biotechnology, vol. 16, Apr. 1998, pp. 393–394.

Cheung, V.G. et al., "Making and reading microarrays", Nature Genetics Supplement, vol. 21, Jan. 1999, pp. 15–19.

Frank, R., "Simultaneous and Combinatorial Chemical Synthesis Techniques for the Generation and Screening of Molecular Diversity", Journal of Biotechnology, vol. 41, 1995, pp. 259–272.

Cox, M.J. et al., "An investigation of Protein Crystallization Parameters Using Successive Automated Grid Searches (SAGS)", Journal of Crystal Growth, vol. 90, Nos. 1–3, (1988), pp. 318–324.

Zeelen, J. et al., "Crystallization Experiments with 2–Enoyl–CoA Hydratase, Using an Automated Fast–Screening Crystallization Protocol", Acta Crystallographica, Section D, 1994, pp. 443–447.

Briggs, J. et al., "The Temperature–Composition Phase Diagram and Mesophase Structure Characterization of the Monoolein/Water System", J. Phys, II France, vol. 6, May 1996, pp. 723–751.

* cited by examiner

| 1 | 9 | 17 | | 1 | 9 | 17 | | 1 | 9 | 17 | | 1 | 9 | 17 |
|---|---|---|---|---|---|---|---|---|---|---|---|---|---|---|
| 2 | 10 | 18 | | 2 | 10 | 18 | | 2 | 10 | 18 | | 2 | 10 | 18 |
| 3 | 11 | 19 | | 3 | 11 | 19 | | 3 | 11 | 19 | | 3 | 11 | 19 |
| 4 | 12 | 20 | | 4 | 12 | 20 | | 4 | 12 | 20 | | 4 | 12 | 20 |
| 5 | 13 | 21 | | 5 | 13 | 21 | | 5 | 13 | 21 | | 5 | 13 | 21 |
| 6 | 14 | 22 | | 6 | 14 | 22 | | 6 | 14 | 22 | | 6 | 14 | 22 |
| 7 | 15 | 23 | | 7 | 15 | 23 | | 7 | 15 | 23 | | 7 | 15 | 23 |
| 8 | 16 | 24 | | 8 | 16 | 24 | | 8 | 16 | 24 | | 8 | 16 | 24 |

AMOUNT(S) OF SOLVENT(S) IN EACH VESSEL: 1 ml | 2 ml | 4 ml | 1.8 ml + 0.2 ml of solvent 22

| 1 | 9 | 17 | 1+22 | 9+22 | 17+22 | 1+4 | 3+4 | 20+2 | | | |
|---|---|---|---|---|---|---|---|---|---|---|---|
| 2 | 10 | 18 | 2+ | 10+ | 18+ | 1+11 | 3+11 | 20+11 | | | |
| 3 | 11 | 19 | 3+ | 11+ | 19+ | 1+17 | 3+17 | 20+17 | | | |
| 4 | 12 | 20 | 4+ | 12+ | 20+ | 1+10 | 3+10 | 20+6 | | | |
| 5 | 13 | 21 | 5+ | 13+ | 21+ | 2+4 | 8+12 | 14+3 | | | |
| 6 | 14 | 22 | 6+ | 14+ | 22+ | 2+11 | 8+3 | 14+16 | | | |
| 7 | 15 | 23 | 7+ | 15+ | 23+ | 2+17 | 8+14 | 14+18 | | | |
| 8 | 16 | 24 | 8+ | 16+ | 24+ | 2+10 | 8+6 | 14+12 | | | |

AMOUNT(S) OF SOLVENT(S) IN EACH VESSEL: 3 ml ; 2.5 ml of first mentioned solvent, 0.5 ml of solvent 22

FIG. 8.

| | 1 ml | | 2 ml | | 4 ml | | 1.8 ml + 0.0.2ml of solvent 22 | |
|---|---|---|---|---|---|---|---|---|
| 1 | 9 | 17 | 1 | 9 | 17 | 1 | 9 | 17 |
| 2 | 10 | 18 | 2 | 10 | 18 | 2 | 10 | 18 |
| 3 | 11 | 19 | 3 | 11 | 19 | 3 | 11 | 19 |
| 4 | 12 | 20 | 4 | 12 | 20 | 4 | 12 | 20 |
| 5 | 13 | 21 | 5 | 13 | 21 | 5 | 13 | 21 |
| 6 | 14 | 22 | 6 | 14 | 22 | 6 | 14 | 22 |
| 7 | 15 | 23 | 7 | 15 | 23 | 7 | 15 | 23 |
| 8 | 16 | 24 | 8 | 16 | 24 | 8 | 16 | 24 |

AMOUNT(S) OF SOLVENT(S) IN EACH VESSEL

FIG.9.

| 1 | 9 | 17 | 1 | 9 | 17 | 1 | 9 | 17 | 1 | 9 | 17 |
|---|---|---|---|---|---|---|---|---|---|---|---|
| 2 | 10 | 18 | 2 | 10 | 18 | 2 | 10 | 18 | 2 | 10 | 18 |
| 3 | 11 | 19 | 3 | 11 | 19 | 3 | 11 | 19 | 3 | 11 | 19 |
| 4 | 12 | 20 | 4 | 12 | 20 | 4 | 12 | 20 | 4 | 12 | 20 |
| 5 | 13 | 21 | 5 | 13 | 21 | 5 | 13 | 21 | 5 | 13 | 21 |
| 6 | 14 | 22 | 6 | 14 | 22 | 6 | 14 | 22 | 6 | 14 | 22 |
| 7 | 15 | 23 | 7 | 15 | 23 | 7 | 15 | 23 | 7 | 15 | 23 |
| 8 | 16 | 24 | 8 | 16 | 24 | 8 | 16 | 24 | 8 | 16 | 24 |

AMOUNT(S) OF SOLVENT(S) IN EACH VESSEL: 1 ml | 2 ml | 4 ml | 1.8 ml + 0.2 ml of solvent 22

FIG.10.

INVESTIGATING DIFFERENT PHYSICAL AND/OR CHEMICAL FORMS OF MATERIALS

This invention relates to investigating different physical and/or chemical forms of materials and particularly, although not exclusively, provides an apparatus for and a method of carrying out such investigations. Preferred embodiments relate to the investigation of polymorphs of materials; resolution of isomeric mixtures; and investigating suitable salts of active materials (e.g. pharmcologically active materials).

Different polymorphs, crystal habits, hydrates/solvates and salts of chemical compounds, for example drugs, generally exhibit marked differences in key properties, such as bio-availability, solubility, density, shock sensitivity, product stability and shelf-life and such properties affect the efficacy of the drugs. It is, therefore, important to optimise the physical and chemical properties of a drug candidate in order to select the best candidate for use in clinical trials Other non-drugs and/or inorganic/organic materials, for example pigments or dyes may also exhibit different properties in dependence upon their form.

Polymorphism is the existence of a substance in two or more forms which are significantly different in physical or chemical properties. The existence of polymorphs of, for example, a drug candidate, can cause problems particularly when scaling-up processes, since a scaled-up process may produce a polymorph having different properties from a polymorph prepared in lab-scale experiments. Thus, pharmaceuticals companies ideally need information on polymorphs of any drug candidates, including an understanding of processing conditions which favour production of particular polymorphs. By way of example, the Journal of Pharmaceutical and Biomedical Analysis Vol. 3. No. 4. pp 303–313, 1985 describes the polymorphism of the drug cimetidine and illustrates how process conditions may be adjusted to prepare particular polymorphs.

In general, current investigations of polymorphs of drug candidates are undertaken by trial and error which involves running a series of, for example, re-crystallisations of a drug candidate using a range of different re-crystallisation conditions and then analysing the re-crystallised products.

Another approach to investigating polymorphs involves computer modelling of drug candidates, for example by calculating what crystal forms could theoretically be prepared and calculating energy minima of such forms. Such an approach may help to focus re-crystallisation experiments directed at preparing each form theoretically identified.

One way of separating an isomeric, for example a diastereomeric, mixture of a material is to prepare diastereomeric salts of the material which have different crystallisation properties thereby allowing the salts to be separated by recrystallisation. Currently, the identification of relevant separable diastereomeric salts is by trial and error and is extremely time-consuming and tedious.

Many drugs are administered in salt form. Desirable properties of such salts include having a melting point in the range 150–200° C., solubility in common solvents, stability, minimum hygroscopicity etc. Furthermore, it is desirable to have polymorphism information on any proposed salt form. However, currently the preparation of suitable salt forms is carried out by trial and error and, accordingly, is not optimized.

It is an object of the present invention to address the above described problems.

According to a first aspect of the invention, there is provided a method of investigating different physical and/or chemical forms of a material, the method comprising:

providing an array of receptacles each containing material (hereinafter "said initial material") to be investigated;

subjecting said initial material in respective different receptacles to respective different treatments under the control of a computer; and analysing any material resulting from said different treatments (hereinafter "said resultant material").

Preferably, the method includes associating data relating to the analysis of each resultant material with information relating to the treatment used to prepare said resultant material from said initial material.

Preferably, data relating to said analysis is stored in said computer and associated with said information relating to the treatment as aforesaid. Preferably, said computer is programmed to determine treatments to which initial material in receptacles is to be subjected. Said computer may determine treatments in dependence upon the results of the analysis of resultant material in a first series of experiments using said array. Thus, treatments may be determined by said computer for a second series of experiments following said first series. The first series of experiments may be determined manually by a user or may be determined by the computer, for example, randomly (since no analysis may be available on which to base a more focussed determination).

Said initial material is preferably a solid. The method preferably involves inputting a predetermined amount of said initial material into each receptacle. For example a weighed amount may be input into each receptacle. This may be done manually by a user or may be undertaken automatically, for example by a robot, suitably under the control of said computer.

There is no limit on the amount of material that may be input into the vessels. Amounts as small as 0.1 mg or as large as 0.5 Kg may be used. Advantageously, however, relatively small amounts may be used.

Said different treatments to which initial material is subjected to prepare resultant material may include variable(s) relating to the solvent or solvents used in the treatments (hereinafter referred to as "solvent variables"). A first solvent variable may be the number of solvents used for preparing resultant material from initial material. For example, in one receptacle of the array only one solvent may be used in a treatment, whereas in another receptacle two or more solvents may be used. A second solvent variable may relate to the timing of the addition of the solvent or solvents into a receptacle. For example, the total amount of solvent to be used in a treatment in one receptacle of the array may be input into the receptacle at the start of the treatment, whereas in another receptacle, the solvent may be input in stages or, if two solvents are used, one may be input at the start of the treatment and another may be input later. A third solvent variable may be the amount of a solvent or solvents used in a treatment. The total amount of solvent used may vary between wide limits and will, of course, depend upon the amount of initial material used. Advantageously, the total amount of solvent in one receptacle may be less than 10 ml, preferably less than 5 ml. A fourth solvent variable may be the identity of a solvent or solvents used. Solvents used may be selected from any solvent that may be used for crystallisation of a material—examples include acetic acid, acetone, anisole, 1-butanol, 2-butanol, butyl acetate, tert-butylmethyl ether, cumene, dimethylsulphoxide, ethanol, ethylacetate, ethyl ether, ethyl formate, formic acid, heptane, isobutyl acetate, isopropyl acetate, methyl acetate, 3-methyl-1-butanol, methylethyl ketone, methylisobutyl ketone, 2-methyl-1-propanol, pentanone, 1-pentanol, 1-propanol, 2-propanol, propyl acetate and tetrahydrofuran.

Suitably, in the method, at least one, preferably at least two, more preferably at least three, especially all of the aforementioned solvent variables are varied in a single series of experiments using said array and/or in multiple series of experiments.

Whilst the solvent variables may be implemented manually, their implementation is preferably under the control of said computer and, accordingly, data relating thereto is preferably stored in the computer. Preferably, said computer controls a robot which introduces predetermined solvent(s) in respective predetermined amounts into respective predetermined receptacles at respective predetermined times.

Said different treatments to which initial material is subjected to prepare resultant material may include a variable relating to the duration of the treatment of said initial material to prepare said resultant material (hereinafter "said duration variable"). Said duration variable is preferably controlled by said computer.

Said different treatments to which initial material is subjected to prepare resultant material may include a variable relating to the operation of a heating means during the treatments (hereinafter referred to as "heating variables"). The method preferably includes the step of the computer controlling a heating means.

A first heating variable may relate to the time of operation of said heating means. A second heating variable may relate to the duration of operation of said heating means. A third heating variable may relate to whether operation of said heating means is continuous or in stages.

Whilst said heating means could be arranged to enable the supply of heat to be individually varied for each respective receptacle in said array, heat may be supplied to groups of receptacles in the array in the same manner. Preferably, heat is supplied to all members of the array in the same manner— that is preferably there is no variation in the supply of heat across the array.

Data relating to said heating variables is preferably stored in said computer and preferably implementation of said variables is controlled by said computer.

Said different treatments to which initial material is subjected to prepare resultant material may include a variable relating to the operation of a cooling means during the treatments (hereinafter referred to as "cooling variables"). The method preferably includes the step of the computer controlling a cooling means.

Said cooling variables may include first, second and/or third variables relating to time, duration and operation as described above for said heating variables.

Said heating means and/or said cooling means may be used to construct any possible heating/cooling profile for use in the method.

Said different treatments to which initial material is subjected to prepare resultant material may include variables relating to the agitation of material in the receptacles during treatment (hereinafter referred to as "agitation variables"). A first agitation variable may relate to the time of operation of an agitation means for agitating material. A second agitation variable may relate to the duration of operation of said agitation means. A third agitation variable may relate to whether operation of said agitation means is continuous or in stages. A fourth agitation variable may relate to the rate of operation of said agitation means.

Whilst said agitation means could be arranged to individually vary the agitation regime in each respective receptacle, conveniently, groups of receptacles in the array are subjected to the same agitation regime. For example, in an 8×12 array, each receptacle in a row of 8 receptacles may be subjected to the same agitation regime, whereas the regime may be varied between rows.

Data relating to said agitation variables is preferably stored in said computer and, preferably, implementation of said variables is controlled by said computer.

Preferably, a temperature profile is defined for each receptacle in the array. Any temperature profile and any number of different temperature profiles may be constructed for use in said method. Data relating to the temperature profile is preferably stored in the computer. It will be appreciated that the temperature profile will be dependent upon a summation of all forms of energy which impinge upon materials in the receptacles. For example, the total energy supplied may be dependent upon the heating means, cooling means and/or the agitation means.

The method may involve said initial material being supported on a porous member which is porous to fluids but not to said initial material, when in solid form. The method may include applying a pressure to prevent solvent (s) passing out of the receptacles, away from said initial material, during treatment of the initial material. The application of said pressure may be controlled by said computer. Said computer may, however, at a predetermined time, reduce or remove the pressure and allow solvent to pass through the porous member. The method may also include applying a vacuum means to each receptacle to suck liquid away therefrom, for example from solid material therein. Again, suitably, operation of the vacuum means is under the control of the computer.

In the method, said resultant material, which suitably remains in said receptacles, may be analysed. Alternatively and/or additionally, liquid removed from the receptacles may be analysed. To this end, the method may include collecting liquid removed from the receptacles in respective collection vessels. Analysis of said resultant material and/or said liquid may be undertaken manually —that is, an operator may remove the material and/or liquid and analyse it. Alternatively, however, analysis of said material and/or said liquid may be undertaken automatically, suitably under the control of said computer. For example material/liquid may be automatically transferred, for example by a robot, to an analysis apparatus, thereby to couple preparation and analysis of resultant materials and provide a substantially fully automatic investigation system.

Data from the analysis of said resultant material and/or said liquid is preferably input into said computer, either manually or automatically.

Analysis of said resultant material and/or said liquid may be undertaken using one or more spectroscopic techniques, for example IR techniques, NMR, diffraction techniques such as X-ray diffraction, powder diffraction, single crystal diffraction, or by one or more thermo analysis, for example differential scanning calorimetry.

Said method may be for investigating polymorphs of a material; for investigating isomers of a material which allow different isomeric forms to be resolved; for investigating different hydrates/solvates; and for investigating different salts of a material.

Where the method is for investigating polymorphs of said initial material, the initial material may be provided in the receptacles and then subjected to different treatments wherein treatments between receptacles in the array vary in terms of one or more of said solvent variables described above; and/or duration variables; and/or said heating variables; and/or said cooling variables; and/or said agitation variables; and/or by having different temperature profiles.

At the end of a treatment in a first series of experiments using said array, said resultant materials (which will be, if produced, re-crystallized forms of said initial material) are suitably analysed to determine if different polymorphs have been prepared. The computer may then determine the variables to be adopted in a second series of experiments using said array, with a view to locating any additional polymorph(s).

Where the method is for the resolution of isomers of said initial material, then, firstly, the initial material may be treated with a range of potential salt forming materials (hereinafter "salt formers") with a view to preparing salts of said initial material. For example, if said initial material is an acid, said range of salt formers may be amines. After treatment with said salt formers, the materials in said receptacles may be subjected to the different treatments described above for investigating polymorphs, suitably in order to re-crystallize predominantly one isomer of a salt of the initial material. After such treatment, either said resultant material may be analysed or liquid removed from said receptacles may be analysed. As will be appreciated, if the latter material shows the existence of a single diastereomer of the salt, then the other diastereomer must be in the resultant material.

Where the method is for investigating different salts of a material, it may be used to select salts of the material that have desirable properties of, for example solubility, toxicity, melting point etc. In this case, in the method, the initial material is treated with a range of potential salt forming materials ("salt formers" as described above with reference to the resolution of isomers). Thereafter, the material is subjected to the different treatment described above for investigating polymorphs, suitably in order to re-crystallize the salts of the initial material. At the end of the treatments, each resultant material is analysed.

The invention extends to a method of examining the effect in a treatment of a material of varying selected treatment variables, the method comprising preparing a first resultant material from an initial material using a first treatment using a first set of experimental variables and preparing a second resultant material from an initial material using a second treatment using a second set of experimental variables, wherein said first and second treatments are controlled by a computer. Preferably, a multiplicity of different treatments are undertaken using an array of receptacles.

The invention extends to a method of preparing a library of resultant materials using an array of receptacles each of which includes an initial material, the method comprising varying selected treatment variables used to prepare resultant materials from said initial material, wherein the treatments to which said initial material are subjected are controlled by a computer.

The invention extends to a method of effecting automatically the preparation of resultant materials from initial material, the method comprising preparing resultant materials from initial material using respective sets of physical and/or chemical treatments, wherein data relating to said sets is stored by a computer, and the treatments are undertaken under the control of the computer.

According to a second aspect of the invention, there is provided apparatus for investigating different physical and/or chemical forms of a material, the apparatus comprising:
an array of receptacles for containing material (hereinafter "initial material") to be investigated;
treatment means for subjecting initial material to respective different treatments; and
a computer arranged to control the respective different treatments to which initial material is subjected.

A said receptacle may include a porous member which is porous to fluids but not to said initial material. Said porous member may define a wall, which may be a lower wall of the receptacle, for supporting initial material. Said apparatus may include pressure means for applying a pressure to restrict the passage of fluid from the receptacle under gravity. Such pressure means is preferably controlled by said computer.

Preferably, each receptacle in said array is as described for said receptacle. Preferably, the receptacles in the array are substantially identical to one another.

Said treatment means preferably includes temperature control means for varying the temperature of materials contained in said receptacles. Said temperature control means preferably includes a heating means associated with said array of receptacles. For example, said heating means may be a heater block, which may include openings in which said receptacles are arranged. Said heating means may be arranged for heating members of said array of receptacles individually or in respective groups. Conveniently, however, said heating means is arranged for heating each receptacle in substantially the same manner.

Said temperature control means may include a cooling means. Cooling of the receptacles may be effected by a reduction in the amount of heat supplied by said heating means and/or by use of a cooling means, for example a cooling coil (or the like), which is at less than ambient temperature.

Operation of said heating means and/or said cooling means is preferably controlled by said computer, suitably in a predetermined manner.

Said temperature control means may be arranged to define any shape of temperature profile for use in the treatment of said initial material.

Preferably, means is associated with said receptacles for reducing loss of material therefrom by evaporation. Suitably, therefore, means is provided for condensing vapour in said receptacles. A condenser means may be associated with each receptacle, for example, by being fitted in an upper end thereof.

Said treatment means preferably includes agitation means for agitating, for example for stirring, material in said receptacles. Said agitation means may be arranged for agitating the contents of each receptacle in an individually controllable manner or groups of receptacles may be arranged to be controlled in the same manner. Preferably, said agitation means is arranged to be controlled by said computer for stirring respective groups of receptacles in substantially the same manner.

Said agitation means may include a stirrer block which may include openings in which said receptacles are arranged.

Preferably, respective collection means are associated with each receptacle in the array for collecting fluid passing out of the receptacles. Said respective collection means are preferably arranged directly underneath respective outlets of said receptacles in the array.

Delivery means may be provided for delivering materials, for example fluids, into the receptacles. Preferably, said delivery means is controllable, suitably by said computer, for delivering materials into respective receptacles. Said delivery means may be arranged to select materials from a material supply means (which suitably includes a multiplicity of different materials) and deliver selected material (s) to a selected receptacle, suitably in a predetermined amount and, suitably, at a predetermined time. Said delivery means is preferably controlled by said computer. Said delivery means is preferably a robot.

Said apparatus preferably includes input means for inputting data relating to material (e.g. "resultant material" of the first aspect) produced after treatment of said initial material, for example, analytical data, into said computer. Preferably, said computer is programmed to analyse data input into it and determine variables to be used in a subsequent investigation on the same initial material, using said apparatus. For example, said computer may be programmed to determine variables which direct subsequent investigations to parameter space which is different to parameter space already investigated and/or parameter space which is predicted (e.g. by software) to yield material with desirable properties.

In one embodiment, analysis of material produced may be undertaken manually and data relating thereto may be manually input into the computer. In another embodiment, material produced may be analysed automatically and data relating thereto may be automatically input into the computer. For example, a robot may remove material produced and arrange it for analysis by suitable analytical apparatus; or material produced may be analysed without removal from the apparatus. Analysis without removal may utilise reflectance IR, reflectance UV, laser Raman scattering or XRD.

The invention extends to the use of apparatus according to the second aspect for investigating different physical and/or chemical forms of a material.

The invention extends to the use of apparatus according to the second aspect in making a library of products.

The invention extends to a library of products in combination with a database incorporating data for each product, wherein said data relates to experimental variables for preparing each product.

The invention extends to the use of apparatus according to the second aspect in effecting automatically a multiplicity of treatments of an initial material which treatments differ in at least one experimental variable.

Any feature of any aspect of any invention or embodiment described herein may be combined with any feature of any aspect of any other invention or embodiment described herein.

Specific embodiments of the invention will now be described, by way of example, with reference to the accompanying diagrammatic drawings, in which:

FIGS. 6 to 10 summarise the solvents used in Experiments which investigate polymorphs of cimetidine.

In the figures, the same or similar parts are annotated with the same reference numerals.

Figure 1:
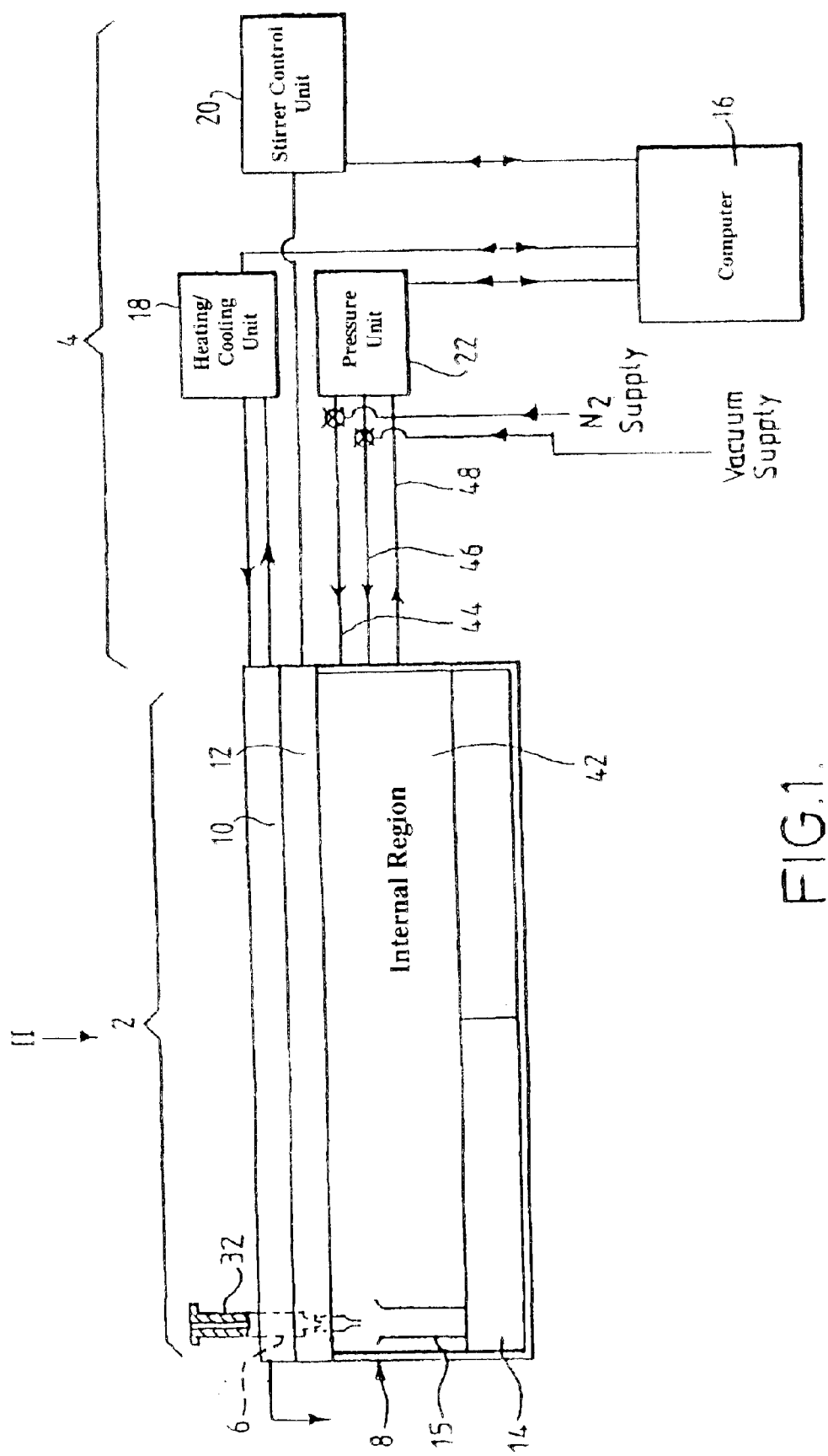
FIG. 1 is a schematic side view of investigation apparatus.
Figure 2:
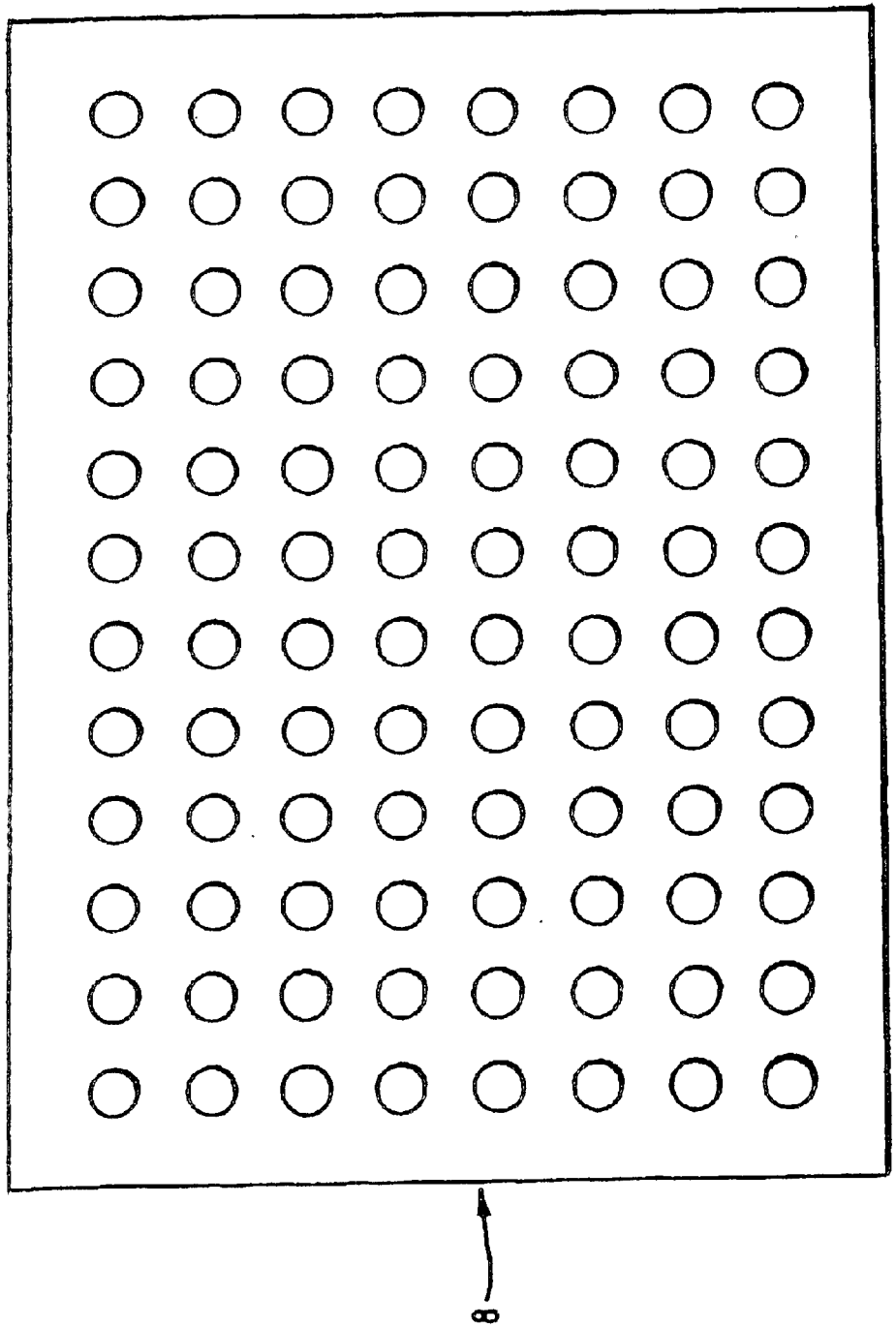
FIG. 2 is a top plan view of a reactor assembly in the direction of arrow II in FIG. 1, with individual reaction devices omitted in the interests of clarity.

The investigation apparatus shown in FIG. 1 comprises a reactor assembly 2 and a control unit 4. The assembly 2 comprises a 12×8 array of reactor devices 6 (only one of which is shown in FIG. 1) arranged within a reactor body 8 which incorporates a heating/cooling block 10 and a stirrer block 12 which are controllable for heating/cooling and stirring the contents of the reactor devices 6. A vessel support block 14 supports respective sample vessels 15 below each reactor device 6 for receiving material from the reactor devices.

The control unit 4 includes a computer 16 which is arranged to control: a robot (not shown) which delivers materials to the reactor devices; a heating/cooling unit 18 which controls the temperature of the reactor devices; a stirrer control unit 20 which controls stirring of materials in the reactor devices; and a pressure unit 22 which controls the passage of material from the reactor devices 6 to the sample vessels 15.

In use, a range of different materials (e.g. bases, solvents etc) may be added to the reactor devices (e.g. in predetermined amounts and at predetermined times) by the robot; the materials may be subjected to predetermined processes (e.g. heating/cooling and stirring regimes) for predetermined times; and, thereafter, material from each reactor device and/or sample vessel 15 may be isolated and analysed, with relevant data relating to each of the aforementioned being stored in the computer.

The investigation apparatus and its uses will now be described in greater detail.

Figure 3:
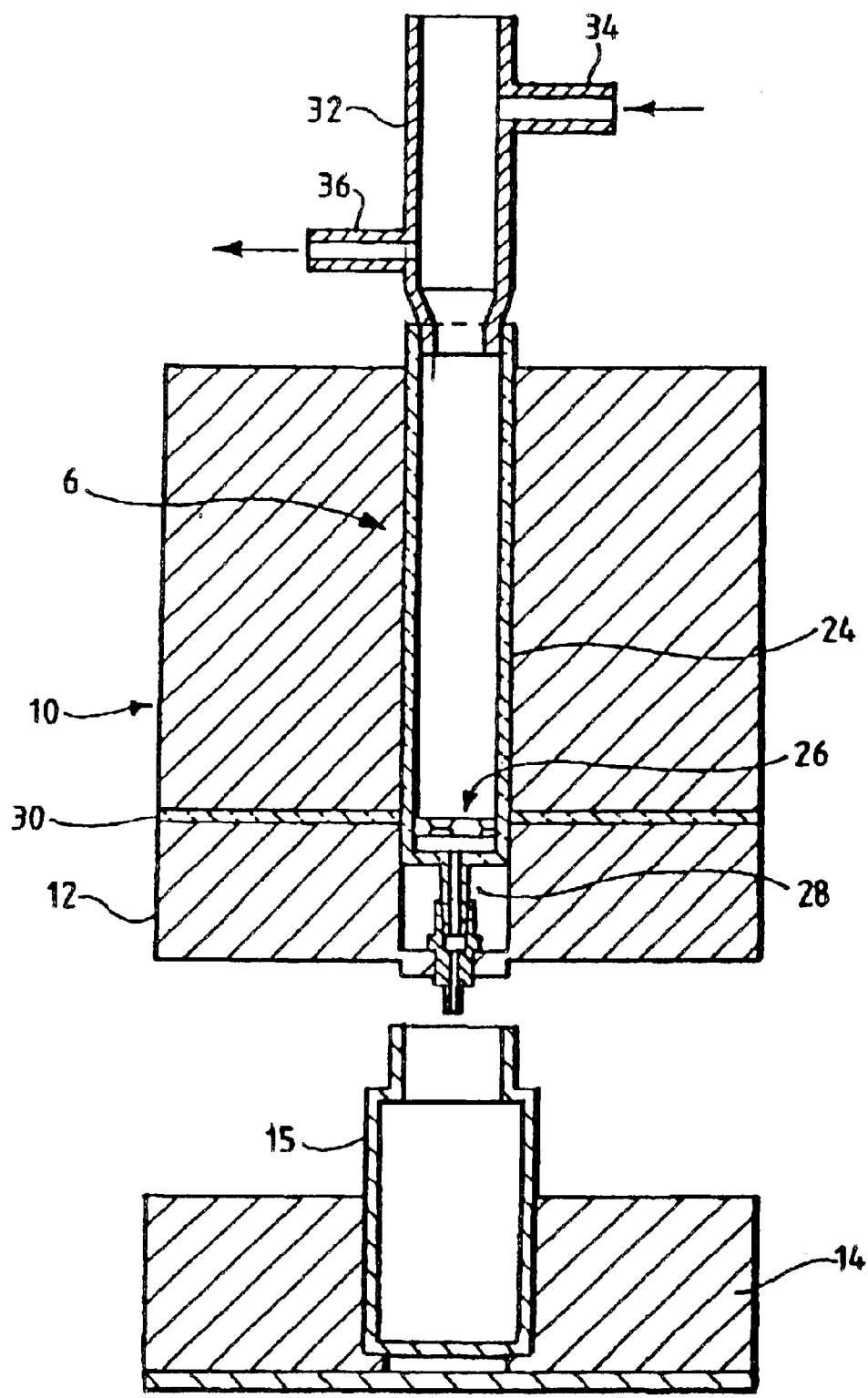
FIG. 3 is a detailed cross-section through a reaction device arranged within the reactor assembly.

The reactor devices 6 are identical. Referring to FIG. 3, the reactor device shown comprises an elongate cylindrical glass vessel 24 having glass frits 26 providing a porous platform at its lower end. (It will be appreciated that any type of filter device may be used). Downstream of the frits the vessel includes an outlet tube 28 having a female luer adaptor.

The stirrer block 12 surrounds a lower end of the reactor device. The block incorporates a magnetic flux stirrer which is arranged to cause movement of a stirrer bar (not shown) which is arranged within cylindrical vessel 24. The stirrer block is arranged such that it is controllable for stirring rows of eight reactor devices in the array at the same rate but allowing variation in the stirring between rows.

It is appreciated that the act of stirring the contents of the reactor devices is a means of inputting energy. Accordingly, not only are details of stirring rates of respective devices stored in the computer but, additionally, data relating to the energy input by such stirring is also stored.

An insulating plate 30 is provided above the stirrer block 12 for insulating it from the heating/cooling block 10 within which the main part of the reactor device is arranged.

Block 10 comprises a heater which is finely controllable by the computer 16. Cooling can be achieved simply by switching the heater off. Whilst means could be provided for varying the heating/cooling of individual reactor devices within the array, it is found to be adequate to apply the same heating/cooling regime to all reactor devices in the array at any one time.

A reflux condenser 32, having a water inlet 34 and outlet 36 is arranged within the reactor device 6 at its upper end. The use of the condenser prevents loss of material by evaporation from the reactor device and can aid cooling of the contents thereof.

Figure 4:
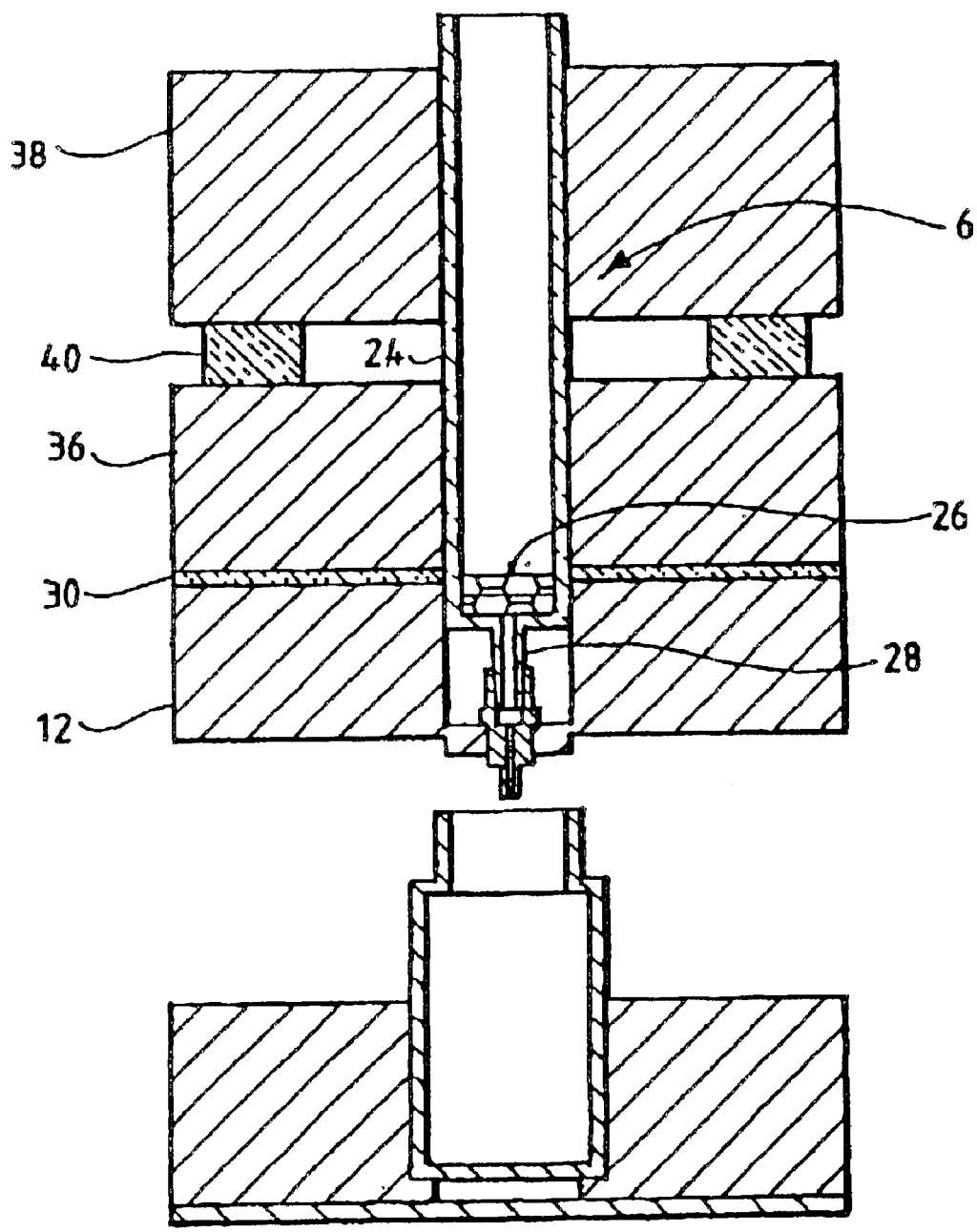
FIG. 4 is a detailed cross-section through an alternative reaction device arranged within a reactor assembly.

As an alternative to the reflux condenser, or in addition thereto, the reactor may include a cooling block. Referring to FIG. 4, the heating/cooling block 10 of FIG. 3 may be replaced with a heating block 36 adjacent insulating plate 30, and a cooling block 38 which is spaced from the heating block 36 by insulating pillars 40. In the FIG. 4 embodiment, the computer is arranged to control operation of both the heating and cooling blocks 36, 38.

As shown in FIG. 1, the reactor devices 6 are arranged within reactor body 8, the internal region 42 of which is a sealed unit when all ninety-six of the reactor devices 6 are in position within the openings defined in the heating/cooling blocks 10 (or 36, 38) and stirrer blocks 12. Nitrogen gas is arranged to be supplied, via line 44, into the internal region 42 for pressurizing it and, in particular, for applying a pressure to prevent flow of fluid, under gravity, through the frits of the reactor devices 6. However, the nitrogen pressure can be removed when desired to allow passage of fluids through the frits into the sample vessels 16, for example at the end of an experimental procedure. Furthermore, a vacuum line 46 communicates with the internal region 42 for controlling the pressure with the region; for example a negative pressure may be applied, to suck fluid through the frits 26 and/or to help to dry solid material supported on the frits. A feedback line 48 also communicates with the internal region for measuring the pressure therewithin and relaying information to the control unit 22. Operation of the control unit 22 which controls supply of nitrogen and the application of a vacuum to the internal region is under the control of the computer 16.

The computer 16 also controls the processes undertaken in each of the reactor devices of the array. In this regard, a unique identifier is assigned to each reactor device and a unique set of process steps may be defined for each. The variables that may be defined for each reactor device when investigating polymorphs include:

A(i) Solvent variables—these may be varied in any respect and may include the identity of a solvent or solvents to be added to a reactor device; the amount of the solvent or solvents to be added; and the timing of the addition of the solvent or solvents. For example, a mixture of solvents may be added at the start of an experiment or one solvent may be added at the start and another may be added five minutes after the start; or a first amount of a solvent may be added at the start and a second amount of the same solvent may be added later. In essence, through robotic control the profile of the added solvent can be infinitely varied.

A(ii) Heating/cooling profile—operation of the heating/cooling block 10 (or the separate heating and cooling blocks 36, 38), for example the time of operation of the heating block, the duration of heating, whether heating is in stages and the cooling regime implemented are controlled by the computer, thereby to define a temperature profile for each reactor device.

A(iii) Stirring rates—operation of the stirrer block, for example the time and duration of its operation are controlled by the computer.

A(iv) Total time—the total time for any particular experiment can be varied.

The apparatus may be used as follows in assessing polymorphs of a particular compound.

Figure 5:
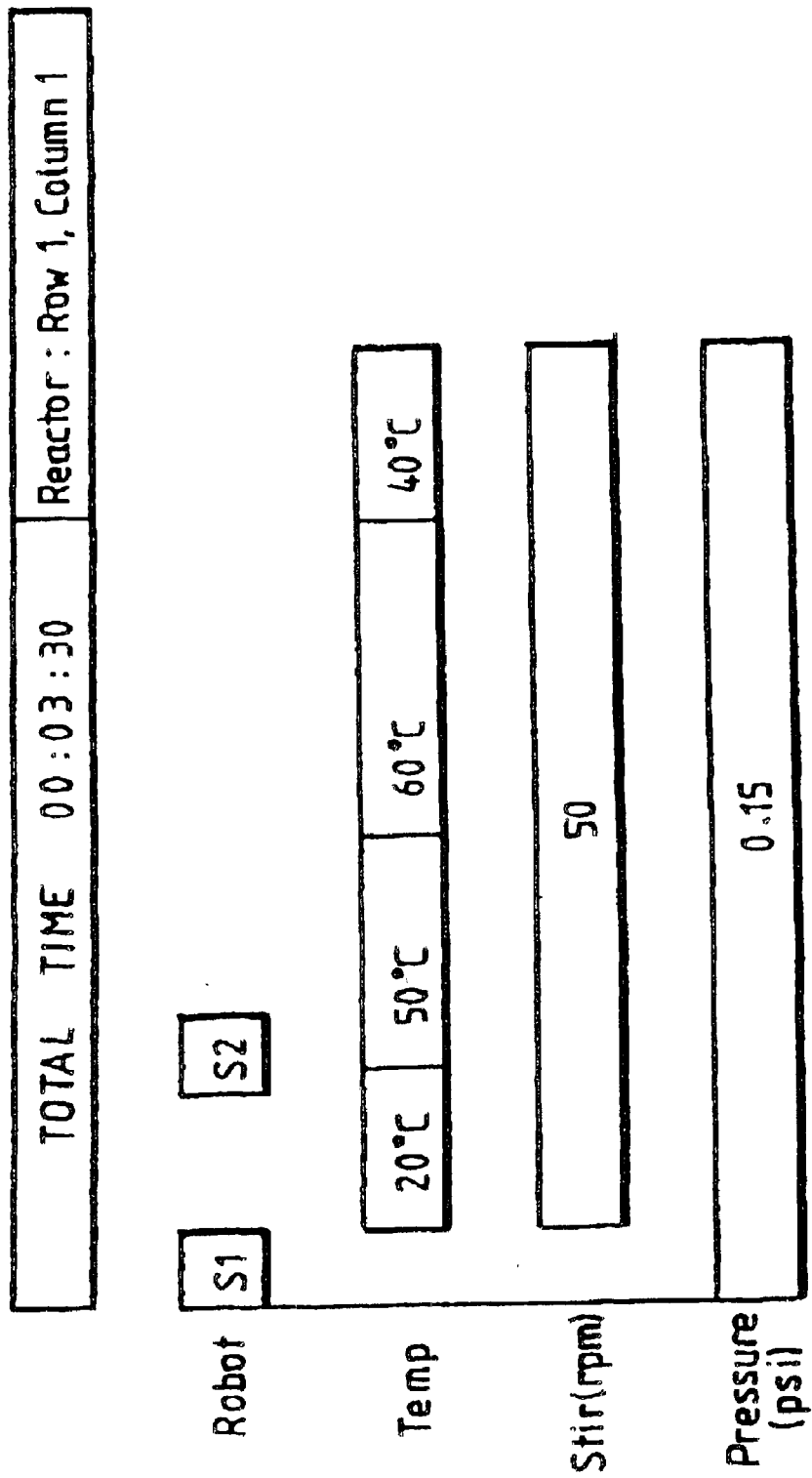
FIG. 5 is a schematic representation of an experimental profile.

The variables described under points A(i) and (iv) for each reactor device are programmed into the computer to define experimental profiles to which materials in the reactor devices are subjected. An experimental profile for a reactor device is illustrated in FIG. 5. The computer itself may be programmed to illustrate profiles as shown in FIG. 5 for reference by an operator. Referring to FIG. 5, the total time from start to finish of the procedure is 3 minutes 30 seconds; the robot delivers solvent 1 (S1) at the start of the procedure and later delivers solvent 2 (S2) (details on the amounts of S1 and S2 are not shown in FIG. 5); the temperature after addition of S1 is 20° C. and this is raised to 50° C. and 60° C. over a period and then allowed to fall to 40° C.; the stir rate is held constant throughout and a positive nitrogen pressure is maintained (thereby to maintain the fluid in the reactor device) until the end of the experiment.

After the computer has been programmed, a measured amount of the compound to be assessed is introduced into the reactor devices so that it sits on the frits 26. A robot may deliver the compound or, alternatively, it may be delivered manually. A multi-pipetting x,y,z gantry type robot is, however, under the control of the computer to deliver predetermined amounts of solvents from a solvent area (for example comprising an 8×4 (or other sized) array of different solvents arranged adjacent the investigation apparatus) to the reactor devices. The predetermined experimental procedures (aimed at causing the crystallisation of polymorphs of the compound under investigation) are then carried out under control of the computer.

At the end of the experimental procedures, the positive pressure provided by the nitrogen supply is removed and a vacuum applied to suck fluid out of the reactor devices. A wash cycle may be carried out to wash any crystals present in the reactor devices. After washing, the crystals may be removed, and analysed and identified, for example by HPLC, laser Raman IR, conventional IR, NMR, X-ray diffraction, powder diffraction, single crystal diffraction and/or Differential Scanning Calorimetry. Analytical data may then be input into the computer and associated with data relating to the experiment procedures implemented in relation to appropriate reactor devices. Also, if no crystals are retrieved, then this fact is also input into the computer.

The computer is programmed to analyse the analytical information in conjunction with the variables used in the experimental procedures to determine the next set of experimental procedures to be undertaken using the apparatus. Software sold under the Trade Mark DIVA by Oxford Molecular Group plc of Oxford, England may be used to undertake this task. For example, the software may select subsequent experiments to explore previously unexplored property space far away from property space previously explored, to determine whether polymorphs exist in the unexplored property space.

Thus, use of the apparatus described may maximize the chances of all relevant polymorphs of a compound being is prepared within the property space being examined in the defined procedure. Furthermore, when a range of polymorphs have been prepared, the most appropriate may be selected for further investigation, for example clinical trials. Additionally, armed with knowledge of the conditions which favour production of the identified polymorphs of the compound, process conditions for plant preparation of the desired polymorph may be controlled to minimize the risk of other, undesired, polymorphs being inadvertently prepared.

The following example describes a procedure used to investigate polymorphs of the known drug cimetidine; the procedure can be applied to an investigation of any material.

Cimetidine was chosen since it is known to have several polymorphs, and the literature teaches the difficulty experienced in determining different physical forms of the material. The following steps were undertaken:

200 mg of commercially available cimetidine (Aldrich 28, 541–2) was loaded to each vessel 24 dry.

A set of 24 commonly used "pharmaceutically acceptable" solvents (see list below) was chosen. The widely differing range of physical properties e.g. boiling point, dielectric constant, salvation propensity thus ensures a comprehensive coverage of solvent property space.

Solvents

1. MeOH
2. EtOH
3. IPA
4. EtOAc
5. IPE
6. TBME
7. DCM

8. Toluene
9. Iso-octane
10. MEK
11. Hexane
12. Petroleum ether 80–100
13. NMP
14. MIBK
15. DMF
16. MeCN
17. Acetone
18. $^i$PrOAc
19. Dioxan
20. THF
21. Petroleum ether 60–80
22. Water
23. 2-methyl-1-propanol
24. Diethyl ether Thermal and stirring parameters were varied within a chosen set of 96 sample vessels 24 according to a predetermined programme or protocol in five separate experiments described below.

Experimental conditions—each of the set of five experiments had a parameter space profile of a type as illustrated in FIG. 5. The exact conditions used are appended to each experiment Experiment 1

FIG. 6 summarises the solvents used in each of the 96 vessels in the array. The conditions used were as follows: Solid charged; solvent(s) added and stirring started; held at 20° C. for 15 minutes; warmed to ca 85° C./reflux and held for 15–20 mins; cooled to ca 30° C. over 2 hours; filtered and vacuum applied for ca 3 hours; products harvested and "evaporated filtrate" samples also collected; samples run by IR to look for polymorphic forms.

Experiment 2

Figure 7:
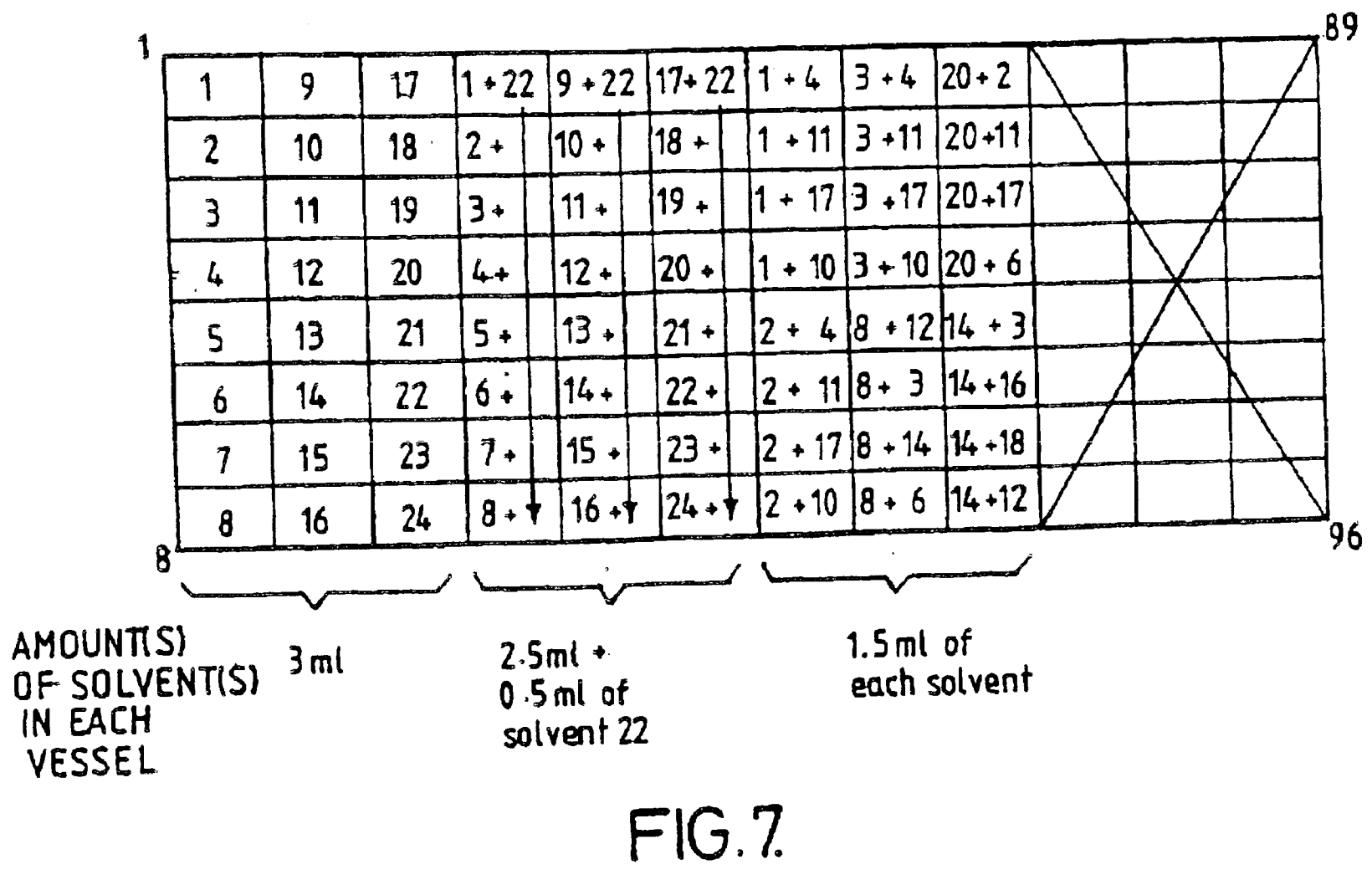

FIG. 7 summarises the solvents used. The conditions used were as follows: Solids charged and then solvents added; stirring started; held at ca 20° C. for 10 minutes; heated to ca 85° C. and held for 10 minutes; cooled to ca 25° C. over 2 hours; filtered under vacuum and vacuum left on for ca 4 hours. Solids collected as well as "evaporative filtrate" samples; analysed by IR for polymorphic forms.

Experiment 3

FIG. 8 summarises the solvents used. The conditions used were as follows: Solids charged, solvents added and stirring started; heated to ca 80° C. and held for 70 minutes; cooled to ca 25° C. over 2½ hours; filtered and vacuum left on for ca 4 hours; solids/evaporated samples collected; analysed by IR for polymorphic forms.

Experiment 4

FIG. 9 summarises the solvents used. The conditions used were as follows: Solids and solvents charged and stirring started; held at 20° C. for 10 minutes; heated to ca 80–85° C. and held for 15 minutes; cooled to ca 60° C. over 30 minutes; held at ca 60° C. for 1 hour; cooled to 40° C. over 30 minutes; held at ca 40° C. for 1 hour; cooled to 25° C. over 1 hour; products harvested by filtration under vacuum; solids collected by filtration and evaporated samples analysed by IR for polymorphic forms.

Experiment 5

FIG. 10 summarises the solvents used. The conditions used were as follows: Solids charged, solvent added and stirring started; held at 20° C. for 10 minutes; heated to 80–85° C. and held for 5 minutes; cooled to ca 10–15° C. over 30 minutes; cooled to 0–5° C. and held for ca 1½ hours; filtered under vacuum and left under vacuum for ca 4 hours; samples collected from vessels and dried in vacuum at 20° C. for 2 hours (many samples damp); evaporative samples also collected; analysed by IR for polymorphic forms.

Results

Examination of the IR spectra revealed that different polymorphs were produced in different sample vessels at alternate areas of the polymorph space utilised. Polymorphs described hereinafter are referred to as described in "The Polymorphism of Cimetidine" J. Pharmaceutical and Biomedical Anal 3, No4 P303–313 (1985). In particular, polymorph A was detected in Experiment 1 vessel 3 (isopropyl alcohol); Experiment 1, vessel 4 (ethyl acetate); Experiment 1, vessel 5 (diisopropyl ether), amongst others. This polymorph was observed more frequently within the parameter space examined, which is consistent with form A being the form generally used.

Polymorph B was, for example, detected in Experiment 1 vessel 22 (water); Experiment 1, vessel 76 (ethyl acetate/water); Experiment 1, vessel 79 (dichloromethane/water).

Polymorph C was for example detected in Experiment 2 vessel 46 (water); and Experiment 3 vessel 46 (water). Examination of IR spectra from other areas of property space revealed absorption bands of different wavelengths than those reported in the literature. These strongly suggest the formation of novel hydrates/polymorphs hitherto unreported in the literature. The invention described herein, therefore, extends to any novel hydrate, polymorph or other material prepared as described herein.

Conclusion

Examination of property space as described in the above experiments illustrates the ability to form different physical forms/hydrates in differing areas of property space as defined.

The investigation apparatus can be used for investigating the separation of diastereomers of a particular compound. In this regard, it is known that diastereomeric salts of individual compounds may have different crystallisation properties in certain solvents. So the apparatus is used to investigate, for a particular compound, which diastereomeric salts can be prepared which are differentially crystallisable in particular solvents, thereby to enable the selection of optimum conditions/reagents for separating the isomers in a commercial preparatory process.

By way of example, if an active ingredient is known to be an acid, then the variables that may be defined for investigation by the apparatus include:

B(i) formulation of different salts—various different amines may be used to prepare different diastereomeric salts of the active ingredient;

B(ii) solvent variables—the variables described in A(i) above may be used to investigate whether the amine salts prepared in B(i) are differentially crystallisable; and B(iii) the heating/cooling profiles, stirring rates and total time as described in A(ii), (iii) and (iv).

The apparatus may be used for investigating differentially crystallisable diastereomeric salts in a similar manner to that described above for assessing polymorphs. In this regard, the variables described under point B(i) to (iii) for each reactor device are programmed into the computer. After the computer has been programmed, a measured amount of the optically active ingredient to be assessed is introduced into the reactor devices. The robot then delivers various predetermined amines and any other required reagents to the devices to prepare desired salts of the active ingredient. It should be appreciated that reagents or solvents used in the preparation may be washed from the salt prepared according to a predetermined process controlled by the computer which may involve delivery of wash solvents by the robot and/or removal of the nitrogen pressure and/or application of a vacuum to separate undesired reagents/solvents from the salt formed.

After the salt has been formed, it may be investigated by re-crystallisation from a predetermined range of solvents under predetermined conditions. After completion of the re-crystallisation process, the nitrogen pressure is removed and the vacuum applied to withdraw mother liquid or supernatant into the sample vessels 15. The crystallised material on the frits and/or the fluid collected in the vessels 15 may be analysed. As will be appreciated, collection of a high level of one diastereomer in one sample vessel 15 implies that the other diastereomer is crystallisable and, therefore, present on the frits of the associated reactor device. It will also be appreciated that the analysis undertaken should show which combination of amine(s) and solvent(s) and/or which physical conditions (e.g. temperature profile, time etc) allow optimum resolution of the diastereomeric active ingredient.

The investigation apparatus may also be used for investigating suitable salt forms in which an active ingredient, such as a drug, may be delivered. By way of example, the variables that may be defined for investigation include:

(i) formation of different salts—various different compounds (e.g. acids or bases) may be used to prepare different salts;

(ii) solvent variables—the variables described in A(i) above may be used to investigate whether the salts prepared are crystallisable from various solvents;

(iii) variables used to investigate whether polymorphs of the different salts exist, e.g. using the variables described in A(i) to (iv).

The apparatus may be used to assess suitable salt forms as described above. Salts prepared may be assessed for polymorph formation and other important properties such as melting point, crystallinity, stability, hygroscopicity, solubility, level of hydration, toxicity etc. may be analysed. Suitably, relevant analytical information is input into the computer which is programmed to analyse which are the best salts for further investigation and/or to provide feedback on possible further experimental investigations to be undertaken.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

What is claimed is:

1. A method of investigating different physical and/or chemical forms of a material, the method being for undertaking an investigation selected from the group comprising:

investigating polymorphs of a material;

investigating isomers of a material in a manner which allows different isomeric forms to be resolved;

investigating different hydrates/solvates of a material; or investigating different salts of a material; the method comprising;

providing an array of receptacles each containing material (hereinafter "said initial material") to be investigated;

subjecting said initial material in respective different receptacles to respective different treatments under the control of a computer; and analysing any material resulting from said different treatments (hereinafter "said resultant material").

2. A method according to claim 1 which includes associating data relating to the analysis of each resultant material with information relating to the treatment(s) used to prepare said resultant material from said initial material.

3. A method according to claim 1, wherein data relating to said analysis is stored in said computer and associated with said information relating to the treatment.

4. A method according to claim 1, wherein said computer is programmed to determine treatments to which initial material in receptacles is to be subjected.

5. A method according to claim 4, wherein said computer determines treatments depending upon the results of the analysis of resultant material in a first series of experiments using said array.

6. A method according to claim 1, wherein said different treatments to which initial material is subjected to prepare resultant material includes variable(s) relating to the solvent or solvents used in the treatments (hereinafter referred to as "solvent variables").

7. A method according to claim 6, wherein said solvent variables are selected from one or more of the following:

a first solvent variable relating to the number of solvents used for preparing resultant material from initial material;

a second solvent variable relating to the timing of the addition of the solvent or solvents into a receptacle;

a third solvent variable relating to the amount of a solvent or solvents used in a treatment; and a fourth solvent variable relating to the identity of a solvent or solvents used.

8. A method according to claim 7, wherein at least two of said solvent variables are varied in a single series of experiments using said array and/or in multiple series of experiments.

9. A method according to claim 7, wherein the implementation of said solvent variables is under the control of said computer.

10. A method according to claim 1, wherein said different treatments to which initial material is subjected to prepare resultant material include a variable relating to the duration of the treatment of said initial material to prepare said resultant material (hereinafter "said duration variables").

11. A method according to claim 1, wherein said different treatments to which initial material is subjected to prepare resultant material include a variable relating to the operation of a heating means during the treatments (hereinafter referred to as "heating variables").

12. A method according to claim 11, wherein said heating variables are selected from one or more of the following:
   a first heating variable relating to the time of operation of said heating means;
   a second heating variable relating to the duration of operation of said heating means; and
   a third heating variable relating to whether operation of said heating means is continuous or in stages.

13. A method according to claim 1, wherein said different treatments to which initial material is subjected to prepare resultant material include a variable relating to the operation of a cooling means during the treatments (hereinafter referred to as "cooling variables").

14. A method according to claim 1, wherein said different treatments to which initial material is subjected to prepare resultant material include variables relating to the agitation of material in the receptacles during treatment (hereinafter referred to as "agitation variables").

15. A method according to claim 14, wherein said agitation variables are selected from one or more of the following:
   a first agitation variable relating to the time of operation of an agitation means for agitating material;
   a second agitation variable relating to the duration of operation of said agitation means;
   a third agitation variable relating to whether operation of said agitation means is continuous or in stages; and
   a fourth agitation variable relating to the rate of operation of said agitation means.

16. A method according to claim 1, wherein a temperature profile is defined for each receptacle in the array and data relating to the temperature profile is stored in said computer.

17. A method according to claim 1, which includes supporting said initial material on a porous member which is porous to fluids but not to said initial material.

18. A method according to claim 1, which includes applying a pressure to prevent solvent(s) passing out of the receptacles, away from said initial material, during treatment of the initial material.

19. A method according to claim 18, wherein application of said pressure is controlled by said computer.

20. A method according to claim 1, wherein said resultant material is analysed and/or liquid removed from the receptacles is analysed.

21. A method according to claim 1 which comprises investigating polymorphs of said initial material.

22. A method according to claim 21, the method including a further step of using said computer to determine variables to be adopted in a second series of experiments using said array with a view to locating additional polymorph(s).

23. A method according to claim 1, wherein the method is for the resolution of isomers of said initial material and includes the steps of:
   treating the initial material with a range of potential salt forming materials (hereinafter "salt formers") with a view to preparing salts of said initial materials; subjecting the materials in said receptacles to different treatments; and, after such treatments, analysing the resultant material or liquid removed from said receptacles.

24. A method according to claim 1, the method being for investigating different salts of a material and comprising the steps of treating the initial material with a range of potential salt forming materials (hereinafter "salt formers") and subjecting the materials to different treatments with a view to re-crystallising the salts of the initial material; and, thereafter, analysing the resultant materials.

25. A method of examining the effects in a treatment of a material of varying selected treatment variables, the method comprising preparing a first resultant material from an initial material using a first treatment using a first set of experimental variables and preparing a second resultant material from an initial material using a second treatment using a second set of experimental variables, wherein said first and second treatments are controlled by a computer.

26. An apparatus for investigating different physical and/or chemical forms of a material, the apparatus comprising:
   an array of receptacles for containing material (hereinafter "initial material") to be investigated;
   treatment means for subjecting initial material to respective different treatments; and
   a computer arranged to control the respective different treatments to which initial material is subjected; and
   wherein means for condensing vapour is associated with said receptacles for reducing loss of material therefrom by evaporation.

27. An apparatus according to claim 26, wherein said receptacles include a porous member which is porous to fluids but not to said initial material, wherein said porous member defines a wall for supporting initial material.

28. An apparatus according to claim 27, which includes pressure means for applying a pressure to restrict the passage of fluid from the receptacles under gravity.

29. An apparatus according to claim 28, wherein said pressure means is controlled by said computer.

30. An apparatus according to claim 26, wherein said treatment means includes temperature control means for varying the temperature of materials contained in said receptacles.

31. An apparatus according to claim 30, wherein said temperature control means includes a heating means and/or a cooling means controlled by said computer in a predetermined manner.

32. An apparatus according to claim 26, wherein said treatment means includes agitation means for agitating material in said receptacles.

33. An apparatus according to claim 26, wherein respective collection means are associated with each receptacle in the array for collecting fluid passing out of the receptacles.

34. An apparatus for investigating different physical and/or chemical forms of a material, the apparatus comprising:
   an array of receptacles for containing material (hereinafter initial material) to be investigated;
   treatment means for subjecting initial material to respective different treatments;
   a computer arranged to control the respective different treatments to which initial material is subjected;
   wherein delivery means is provided for delivering materials into the receptacles, said delivery means being arranged to select materials from a material supply means and deliver selected materials to a selected receptacle in a predetermined amount and at a predetermined time.

35. An apparatus according to claim 34 for investigating different physical and/or chemical forms of a material.

36. An apparatus according to claim 34 for making a library of products.

37. An apparatus according to claim 34 for effecting automatically a multiplicity of treatments of an initial material which treatments differ in at least one experimental variable.

38. An apparatus for investigating different physical and/or chemical forms of a material, the apparatus comprising:

an array of receptacles for containing material (hereinafter "initial material") to be investigated;

treatment means for subjecting initial material to respective different treatments; and a computer arranged to control the respective different treatments to which initial material is subjected;

wherein said apparatus includes input means for inputting analytical data relating to material produced after treatment of said initial material into said computer, wherein said computer is programmed to analyse data input into it and determine variables to be used in a subsequent investigation on the same initial material, using said apparatus.

39. An apparatus according to claim 38 for investigating different physical and/or chemical forms of a material.

40. An apparatus according to claim 38 for making a library of products.

41. An apparatus according to claim 38 for effecting automatically a multiplicity of treatments of an initial material which treatments differ in at least one experimental variable.

42. A method according to claim 1, the method being for investigating isomers of a material in a manner which allows different isomeric forms to be resolved.

43. A method according to claim 1, wherein the method is for investigating different hydrates/solvates of a material.

44. A method according to claim 1, the method being for investigating different salts of a material.

45. A method of investigating different physical and/or chemical forms of a material, the method comprising:

providing an array of receptacles each containing material (hereinafter "said initial material") to be investigated;

subjecting said initial material in respective different receptacles to respective different treatments under the control of a computer;

analysing any material resulting from said different treatments (hereinafter "said resultant material"); and investigating polymorphs of said initial material.

46. A method according to claim 45, the method including a further step of using said computer to determine variables to be adopted in a second series of experiments using said array with a view to locating additional polymorph(s).

47. A method of investigating different physical and/or chemical forms of a material, the method comprising:

providing an array of receptacles each containing material (hereinafter "said initial material") to be investigated;

subjecting said initial material in respective different receptacles to respective different treatments under the control of a computer; and analysing any material resulting from said different treatments (hereinafter "said resultant material");

wherein the method is for the resolution of isomers of said initial material and includes the steps of:

treating the initial material with a range of potential salt forming materials (hereinafter "salt formers") with a view to preparing salts of said initial materials; subjecting the materials in said receptacles to different treatments; and, after such treatments, analysing the resultant material or liquid removed from said receptacles.

48. A method of investigating different physical and/or chemical forms of a material, the method comprising:

providing an array of receptacles each containing material (hereinafter "said initial material") to be investigated;

subjecting said initial material in respective different receptacles to respective different treatments under the control of a computer; and analysing any material resulting from said different treatments (hereinafter "said resultant material")

the method being for investigating different salts of a material and comprising the steps of treating the initial material with a range of potential salt forming materials (hereinafter "salt formers") and subjecting the materials to different treatments with a view to re-crystallising the salts of the initial material; and, thereafter, analysing the resultant materials.

49. A method of investigating different physical and/or chemical forms of a material, the method being for undertaking an investigation selected from the group comprising:

investigating polymorphs of a material;

investigating isomers of a material in a manner which allows different isomeric forms to be resolved;

investigating different hydrates/solvates of a material; or investigating different salts of a material; the method comprising:

providing an array of receptacles each having a lower wall and each containing material (hereinafter "said initial material") to be investigated supported on a respective lower wall;

subjecting said initial material in respective different receptacles to respective different treatments under the control of a computer; and analysing any material resulting from said different treatments (hereinafter "said resultant material").

50. A method of investigating different physical and/or chemical forms of a material, the method being for undertaking an investigation selected from the group comprising:

investigating polymorphs of a material;

investigating isomers of a material in a manner which allows different isomeric forms to be resolved;

investigating different hydrates/solvates of a material; or investigating different salts of a material; the method comprising:

providing an array of receptacles each containing material (hereinafter "said initial material") to be investigated, wherein said initial material is a solid;

subjecting said initial material in respective different receptacles to respective different treatments under the control of a computer; and analysing any material resulting from said different treatments (hereinafter "said resultant material").

* * * * *